United States Patent [19]

Digneffe

[11] 3,990,000
[45] Nov. 2, 1976

[54] ALTERNATING CURRENT CONTROL SYSTEM

[75] Inventor: Henri Joseph Digneffe, Fexhe Slins, Belgium

[73] Assignee: RCA Corporation, New York, N.Y.

[22] Filed: July 10, 1975

[21] Appl. No.: 594,631

[52] U.S. Cl. .................................. 323/24; 307/133; 315/292; 340/347 DA
[51] Int. Cl.$^2$ .......................................... G05F 1/44
[58] Field of Search ........ 323/19, 22 SC, 24, 34–38, 323/39, 41; 340/347 DA, 347 AD; 307/252 UA, 228, 235 E, 235 J, 133; 315/292, 297, 316, 317

[56] References Cited
UNITED STATES PATENTS

| | | | |
|---|---|---|---|
| 3,496,562 | 2/1970 | Smith | 340/347 DA |
| 3,514,670 | 5/1970 | Isaacs | 315/292 |
| 3,544,993 | 12/1970 | Gabriel | 340/347 AD |
| 3,684,919 | 8/1972 | Cramer | 323/24 X |
| 3,783,367 | 1/1974 | Yamamoto et al. | 323/22 SC |
| 3,786,488 | 1/1974 | Ahlgren | 340/347 DA |

Primary Examiner—Gerald Goldberg
Attorney, Agent, or Firm—H. Christoffersen; S. Cohen; R. G. Coalter

[57] ABSTRACT

An alternating current signal is applied across a series connected switch and load and also to a synchronous ramp generator. The switch is closed by a comparator when the ramp generator output signal is greater in a given sense than an analog reference signal. The reference signal is produced by a digital-to-analog converter responsive to the count in an up-down counter so that the period during which the switch is closed each cycle is controlled by the count in the counter and the shape of the synchronous ramp signal. The ramp signal may be a linear or non-linear function of time thereby providing linear or non-linear incremental changes in the switch conduction period for given incremental changes in the count.

3 Claims, 5 Drawing Figures

ALTERNATING CURRENT CONTROL SYSTEM

This invention relates to power control systems and particularly to AC phase controlled systems.

Alternating current phase control systems employing triggerable bidirectional switching devices, such as thyristors, are known. In such systems the switching device is connected in series with a load across a source of alternating current and the load current is controlled by governing the phase angle of the AC wave at which the thyristor is triggered. Once triggered, the thyristor conducts for the remainder of half cycle in which it was triggered.

Where it is desired to vary the phase angle manually for conducting differing values of load current it is customary to employ variable phase shift circuits in which the phase is controlled, for example, by a potentiometer. Potentiometers, however, suffer the disadvantages of electromechanical devices generally. Additionally, the taper of the potentiometer determines to a substantial extent the incremental phase respond characteristic of the phase shift circuit. For a given potentiometer, the taper is fixed and that makes it difficult to change the system's incremental phase response to meet differing application requirements.

The present invention does not employ such mechanical control devices and has the capability of producing linear or non-linear incremental phase response by relatively simple circuit modifications. The latter form of response, for reasons explained subsequently, is particularly desirable in applications where the load comprises an incandescent lamp or group of lamps.

Where it is desired to control the phase electrically, it is customary to employ analog control signals. Transmission of such signals over substantial distances, however, requires that careful attention be given to problems such as transmission line attenuation and noise pick-up. Such problems are minimized in the present invention which does not require the analog transmission of control signals.

The present invention is directed to meeting the need for an AC power control system easily adaptable for linear or non-linear incremental phase response and capable of being remotely controlled from a plurality of locations by a control signal format easily adaptable to both manual and direct computer control and which is relatively insensitive to transmission line losses and noise.

The invention is illustrated in the accompanying drawings wherein like elements are designated by like numbers and in which.

Figure 1:
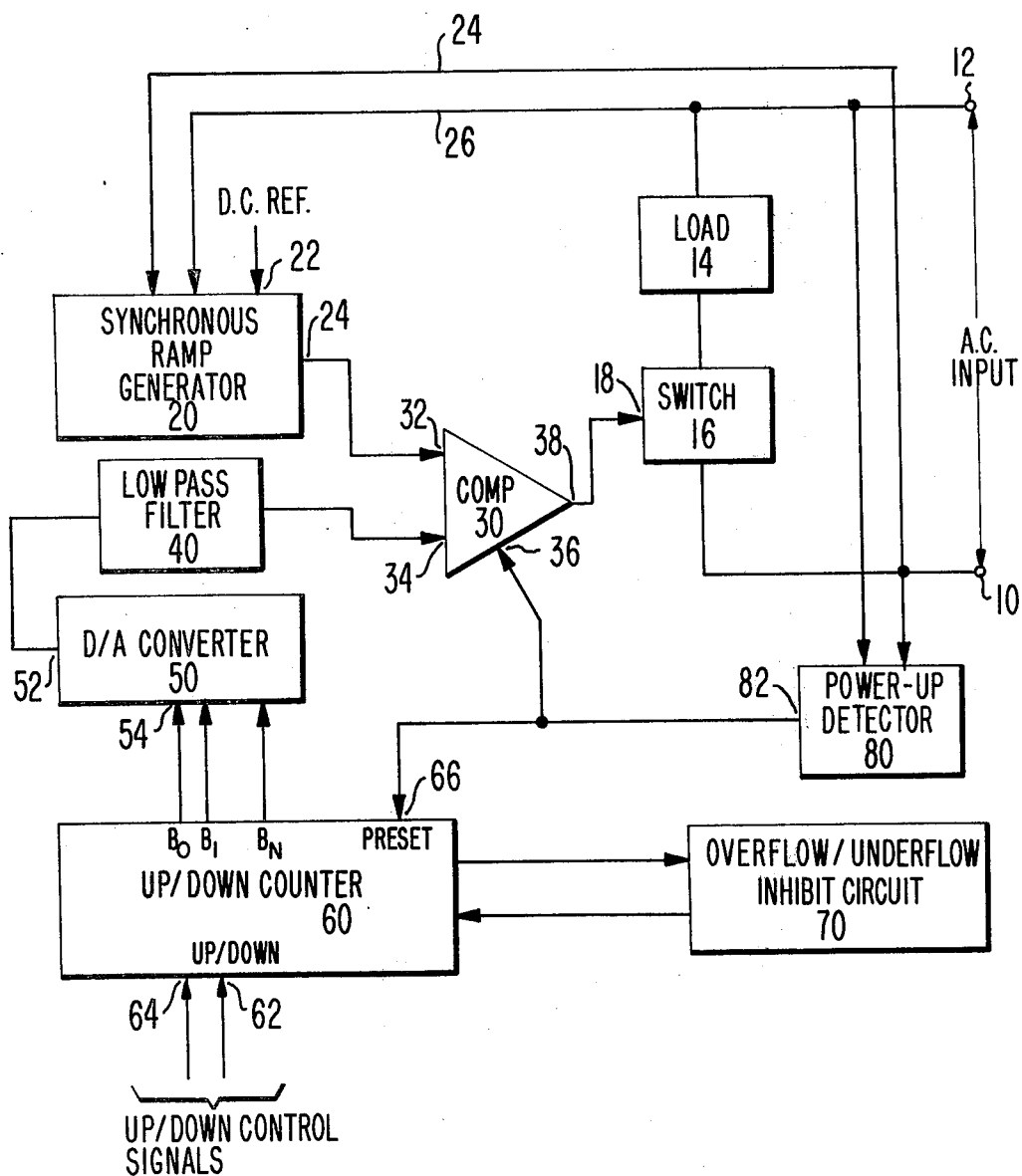
FIG. 1 is a block diagram of an alternating current control system embodying the invention.

The alternating current control system of FIG. 1 illustrates a useful application of the present invention in an incandescent lamp dimming system. The feature of the present invention of digitally controlled non-linear incremental phase response is particularly advantageous in such a system because, as will be explained, nonlinearities in the load characteristics can be effectively cancelled by the system nonlinearities for providing uniform changes in the lamp brightness for uniform changes in the digital control signals. As will be explained in the discussion of FIGS. 1 and 2, the invention is also adaptable to applications requiring linear incremental phase response by modification of the synchronous ramp generator.

In FIG. 1, input terminals 10 and 12 receive an alternating current such as AC at the usual 50 or 60 Hertz power line frequency. Load 14 is connected in series with switch 16 between therminals 10 and 12. Load 14, for purposes of the following discussion, is an incandescent lighting load. Switch 16 is a bi-directional switch having a normally open conduction path which is placed in a conductive state by application of a control signal to the control electrode 18 thereof.

Figure 3:
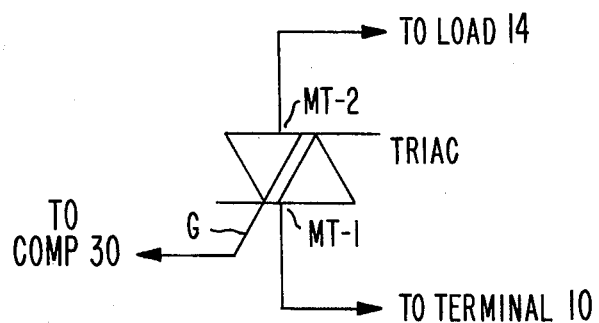
FIG. 3 illustrates a switch suitable for use in the system of FIG. 1.

Switch 16 may be a bipolar transistor or an SCR connected across the output terminals of a full-wave diode-bridge to achieve bidirectional conduction through the bridge AC input terminal, or it may be bidirectionally conductive device. It could even be a relay although, of course, the switching speed of known relays is relatively slow. Preferably, however, switch 16 is a bidirectional triode thyristor such as a triac as shown in FIG. 3. A triac is preferred because, due to its "latching" characteristic, continuous turn-on power is not required to maintain it in a conductive state and this represents an advantage in efficiency over non-latching switching devices. Additionally, a triac is an inherently faster switching device than a relay and typically has a substantially lower operating power loss than a transistor or SCR in a diode bridge configuration (even assuming continuous triggering). Accordingly, in the discussion of FIG. 1 which follows, it will be assumed that switch 16 is a triac as illustrated in FIG. 3 having the main terminals thereof (MT-1 and MT-2) connected in series with load 14 across AC input terminals 10 and 12 and the gate terminal thereof connected to output terminal 38 of comparator 30.

Synchronous ramp generator 20 receives a direct current (DC) reference signal at input 22 from a suitable source (not shown) and receives an alternating current (AC) reference signal via lines 24 and 26 which are coupled to input terminals 10 and 12 respectively. The ramp generator is responsive to the AC reference signal for producing a ramp output signal synchronized therewith, the ramp output signal beginning at a first value, monotonically changing to a second valve and resetting to the first value twice each period T of the alternating current input signal.

Figure 4A:
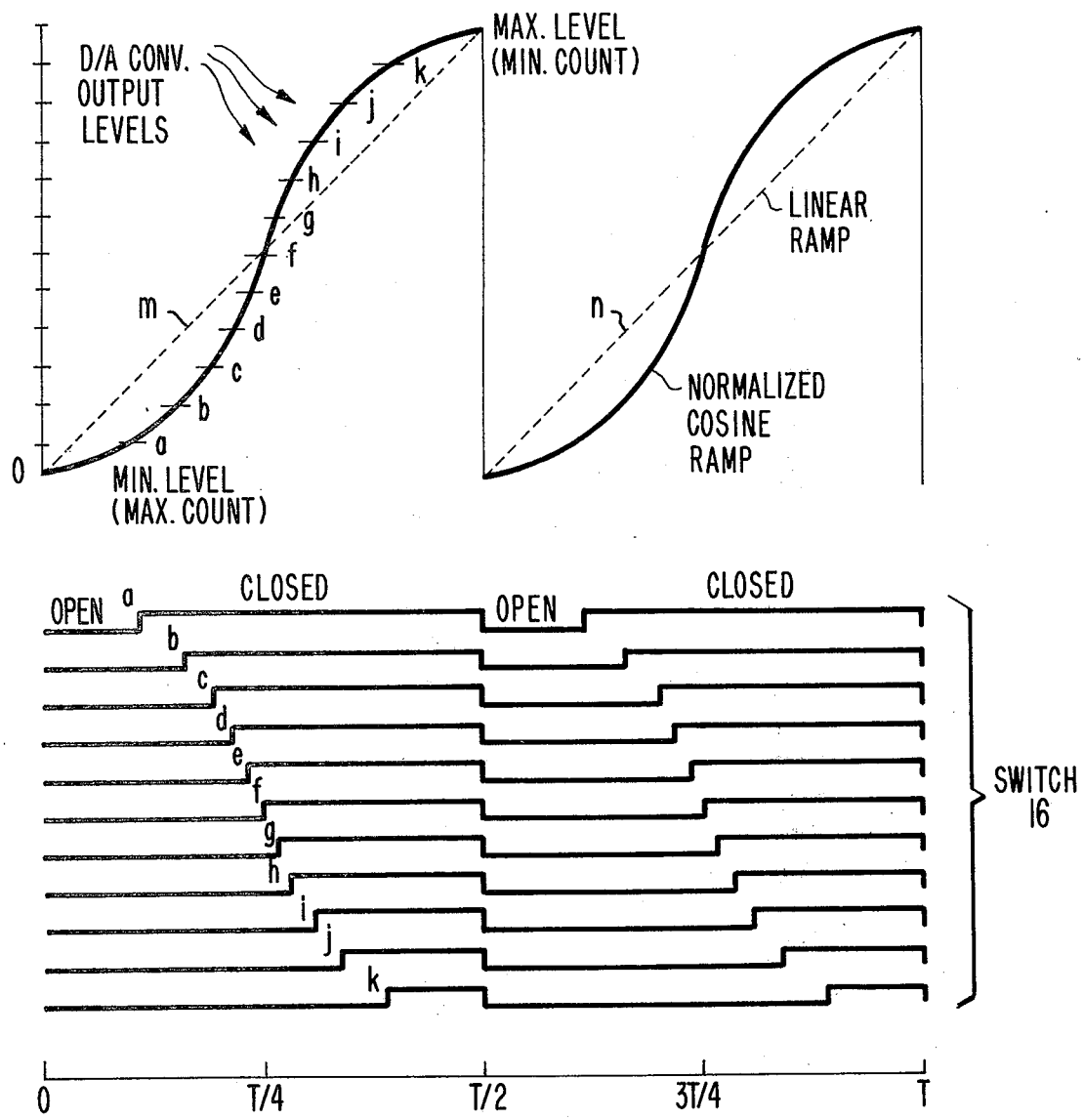
FIGS. 4a and 4b illustrate waveforms associated with the system of FIG. 1.

It is the shape of the ramp signal produced by generator 20 which determines the overall incremental phase reponse of the system of FIG. 1. In applications requiring linear phase control for uniform incremental changes in input control signals the ramp may be linear. In this example of the invention however, where load 16 is an incandescent lighting load, and nonlinear phase control is desired, the ramp is of a nonlinear waveform. In particular, as discussed in detail below, the ramp waveform is of the form of a double frequency cosine as shown in FIG. 4a. Details of construction of a suitable ramp generator for such a waveform (also for producing linear ramps) is given in the discussion of FIG. 2.

Comparator 30 has a non-inverting input terminal 32 connected to output terminal 24 of generator 20, an inverting input terminal 34 coupled via low pass filter 40 to output terminal 52 of digital-to-analog converter 50, an inhibit input terminal 36 coupled to output terminal 82 of power-up detector 80 and an output terminal 38 coupled to the control terminal 18 of switch 16. (Switch 16 corresponds in the present discussion to the triac of FIG. 3 control terminal 18 corresponds to gate G thereof).

Comparator 30 produces a positive output signal for closing switch 16 when the potential at non-inverting input terminal 32 exceeds that of inverting input terminal 34 in the absence of an inhibit input signal at terminal 36. Conversely, the output signal at terminal 18 is clamped to a reference potential (such as ground) for preventing closure of switch 16 when either the inhibit signal is present or the potential applied to inverting input terminal 34 exceeds that of non-inverting input terminal 32. In other words, the inhibit signal, when present, overrides the effect of signals supplied to the inverting and non-inverting input terminals causing output terminal 38 to be clamped to the reference potential thereby preventing closure of switch 16.

Comparator 30 may comprise simply a differential amplifier of transistor switch. It is not essential that it have an inhibit input terminal as shown but it is preferred in this particular application that means be provided to inhibit the closure of switch 16 in response to a control signal. The control signal, as will be explained, is momentarily applied upon initial start-up of the system to assure that a desired initial operating condition results. One example of a part particularly suitable for use as a comparator 30 in this example of the invention is the RCA Corporation type CA 3059 Integrated Circuit. That part, in addition to including a comparator (differential amplifier) which can be inhibited also includes an output buffer particularly suited for driving thyristor switches. A complete description of this part may be found in RCA Corporation Application Note ICAN-6182 entitled "Features and Applications of RCA Integrated-Circuit Zero-Voltage Switches" by A. N. Sheng, G. J. Granieri and J. Yellin.

Digital-to-analog (D/A) converter 50 receives weighted binary valued input signals (Bo-Bn) at input 54 and produces an analog output signal representative thereof at output terminal 52 which, after being smoothed by lowpass filter 40, is applied to the inverting input terminal of comparator 30. The purpose of low pass filter 40 is to prevent switching transients (which normally occur as converter 50 settles) from reaching inverting input terminal 34. The low pass filter may be, for example, of the resistor-capacitor type and the D/A converter may be of the R/2R ladder type both of which are well known in the art.

Up-down counter 60, a conventional bidirectional counter, is coupled to D/A converter 50 for supplying the binary signals Bo-Bn thereto in accordance with the count stored in the counter. Counter 60 is responsive to UP/DOWN control signals supplied to UP/DOWN control terminals 62, 64 thereof for incrementing an decrementing the count. Preferably, the counter also includes means such as preset terminal 66 which is connected to output terminal 82 of power-up detector 80, for placing the counter in a given initial condition.

A number of suitable bidirectional counters are commercially available for use as a counter 60. It may be, for example, an RCA Corporation type CD-4029. A complete description of this part is to be found at pages 22–27 of "COS/MOS IC's For Low-Voltage (3–15V) Applications" which was published by RCA Corporation, October, 1973. Other suitable counters are described in "Handbook of Logic Circuits" by J. D. Lenk, published by Reston Publishing Company, Inc. (1972).

Overflow-underflow inhibit circuit 70 is a conventional logic circuit coupled to counter 60 for limiting the maximum and minimum values of the count. Techniques for implementing this function are quite well known. For example, the counter data output signals (Bo-Bn) may be applied to a first logic gate which inhibits the UP control signal when the maximum count is reached and to a second logic gate which inhibits the DOWN control signal when the minimum count is reached. Of course, if the minimum count is all zeros and the maximum count is all ones the counter carry-borrow output signals can be used to provide the inhibiting signals.

Power-up detector 80 is coupled to input terminals 10 and 12 and produces a momentary output signal at terminal 82 upon initial application of the AC input signal. As previously noted, the power-up detector output signal is employed to preset counter 60 to an initial condition and to momentarily inhibit comparator 30. Detector 80, is, in effect, a kind of "fail-safe" circuit which assures that the power control system assumes an initial condition (no output) upon start-up or momentarily interruptions of the AC signal. Where such "initializing" of the synchronous pulse generator is not required, this detector may be omitted. Detector circuits suitable for performing this function for DC input signals are described in RCA Corporation Technical Note No. 927 entitled "Turn-On Reset Pulse Circuits" by G. D. Hanchett, published 28 Mar. 28, 1973. Such DC detectors may be used as detectors 80 by first rectifying the AC signal to produce a DC signal. A momentary pulse may then be derived in the conventional manner from the DC signal.

Overall operation of the AC power control system of FIG. 1 is as follows. Upon application of the AC input signal across terminals 10 and 12, power-up detector 80 produces an output pulse which presets UP-DOWN counter 60 to its maximum count and simultaneously momentarily inhibits comparator 30. Comparator 30 is thus prevented from closing switch 16 regardless of the relative potentials at its inverting and non-inverting input terminals. Since the count in counter 60 is at a maximum value, D/A converter 50 applies a maximum output voltage via low pass filter 40 to inverting input terminal 34 of comparator 30. Simultaneously, synchronous ramp generator 20 supplies a cosine shaped output signal synchronized with the axis crossings of the AC signal to non-inverting input terminal 32 of comparator 30.

The comparator input signals and the operation of switch 16 are illustrated in detail in FIG. 4. The horizontal scale corresponds to one complete period T, of the AC signal where the zero crossings thereof occur at O, T/2 and T, and the positive and negative maxima occur at T/4 and 3T/4, respectively. For ease of explanation, the cosine shaped ramp and representative D/A converter output signal levels are shown normalized on a scale from zero to one. The condition of switch 16 (open or closed) for different levels $a$–$k$ of the D/A converter output signal is illustrated by the correspondingly identified switch 16 waveforms. Also, for purposes of illustration the ramp is shown to be instantly reset at each axis crossing (O, T/2, T) although, in practice, a finite length of time is required for the ramp reset transition.

The inhibit signal produced by power-up detector 80 terminates after a period of time sufficient for the circuit operating potentials to stabilize. As noted previously, the purpose of detector 80 is to insure that at start-up the system assumes an initial condition (counter at maximum and switch 16 OFF). Having produced the "initialized" signal, detector 80 performs no further circuit function during normal operation of the system unless the AC input should be interrupted. If that occurs, detector 80 automatically reinitiates the above-described start-up sequence.

With the inhibit signal terminated, comparator 30 is primed to close switch 16 whenever the synchronous ramp signal exceeds the D/A converter output signal. Accordingly, with the converter signal at its maximum level (corresponding to the maximum count of counter 60) switch 16 is maintained continuously open throughout a given cycle of the AC signal so that no load current flows through load 14. Conversely, when the converter signal is at its minimum level (corresponding to the minimum count in counter 60) switch 16 is maintained closed for conducting load current throughout the cycle.

In practice, the user adjusts the control signals applied to the counter 60 to obtain the desired amount of power delivered to the load 14. Initially, the values of the control signals may be such that the count is at its maximum value and in this case no power is delivered to the load, as already mentioned. If now the counter control signals are changed so that the count is decreased, in the case of a lamp load and a consinusoidal ramp, the lamp will go on and its intensity will increase linearly with time. If after a certain intensity is reached it is desired that the lamp remain on at that level, the control signals at 64 and 62 are no longer varied — they remain at a constant value so that the count produced by the counter no longer changes and constant power is delivered to the load. To decrease the lamp intensity, the up control signal is applied to increase the count. Again, a linear increase in the count corresponds to a linear decrease in the lamp intensity.

In more detail, for values of the count between minimum and maximum limits, the conduction period of switch 16 (i.e., the period of time that switch 16 is closed during a given cycle) is dependent upon the count in counter 60 and, in particular, the shape of the synchronous ramp signal. In applications where the ramp is linear (as indicated by dashed lines $m$ and $n$ in FIG. 4) the conduction period is linearly related to the count. That is, linear incremental changes in the count result in linear incremental changes in the conduction period. It is to be remembered, however, that the AC signal is a sine wave and for such a waveform linear incremental changes in the switch conduction period necessarily result in non-linear incremental changes in the power delivered to the load where the load impedance is real and linear.

Figure 4B:
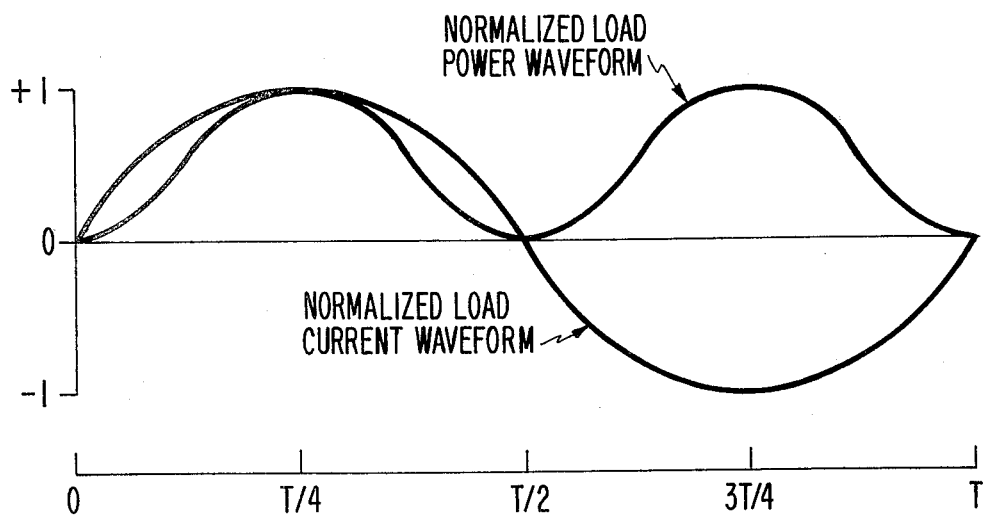

A substantially linear relationship between the power delivered to an "ideal" resistive load and the count in counter 60 is provided in the present invention by the nonlinear (cosinusoidal) ramp. This results because the power delivered to a resistive load by a sinusoidal voltage or current varies as the square thereof and thus has a double-frequency cosinusoidal waveform with maxima at $T/4$ and $3T/4$ and minima at $O$, $T/2$ and $T$ as shown in FIG. 4b. From FIGS. 4a it is seen that for linear changes in the count, the maximum incremental changes in the conduction period of switch 16 occur at $O$, $T/2$ and $T$ while the minimum incremental changes occur at $T/4$ and $3T/4$. Due to this complementary relationship, the load power and the count in counter 60 are linearly related.

An incandescent lamp, of course, is not truly a linear resistive load and the candle power of such a lamp is not a linear function of the power supplied thereto. In particular, for a tungsten lamp the rate-of-change of candle power vs. electrical power input is positive. Because of this, the most useful range of operation for lamp dimming applications is not 0 to 100 percent of rated power but is more limited. A limited control range may be achieved in the system of FIG. 1 by appropriate adjustment of the ramp signal amplitude and bias level or the minimum and maximum values of the count. As an example, by limiting the maximum count to a value corresponding to level $f$ in FIG. 4, the conduction period of switch 16 for one full cycle of the AC signal will vary from a minimum of 180 electrical degrees and a maximum of 360 electrical degrees over the full range of the counter. Such limited operation can also be achieved by varying numerous other parameters of the ramp and converter output signals such as the relative amplitudes and bias levels thereof.

Figure 2:
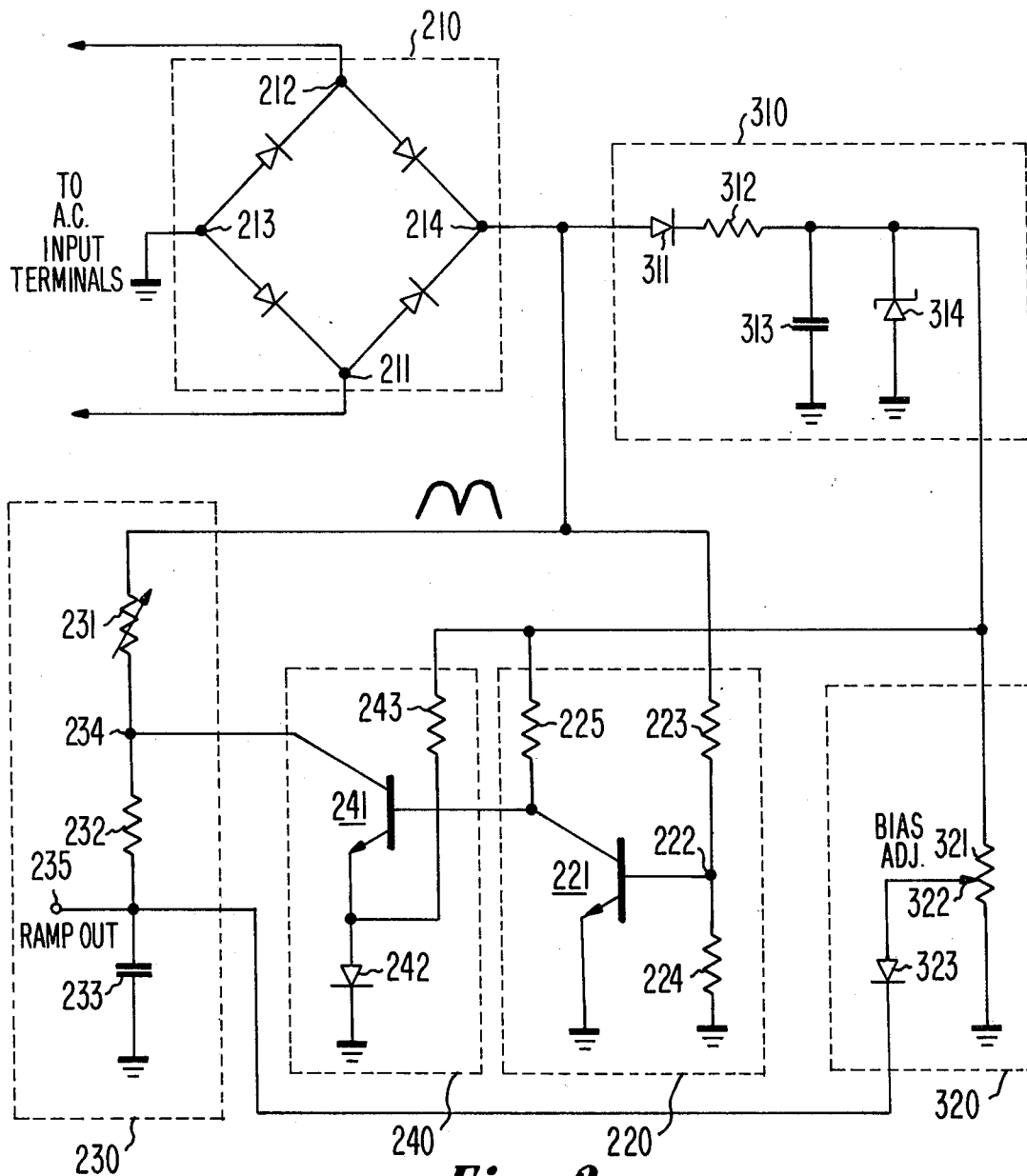
FIG. 2 is a circuit diagram of a synchronous ramp generator suitable for use in the system of FIG. 1.

FIG. 2 illustrates a circuit suitable for implementing synchronous ramp generator 10 to FIG. 1. The principal elements of FIG. 2 comprise: a full wave rectifier 210 which is responsive to the AC input signal for producing a full wave rectified output signal; an integrator 230 for integrating the rectifier output signal; a zero voltage detector 220 for detecting zeros of the rectifier output signal (which correspond to the axis crossings of the AC signal); and a clamp circuit 240 coupled to the integrator and activated by the zero voltage detector. The integrator therefore is reset at each axis crossing of the AC signal, thereby producing a generally cosine shaped ramp output signal each half-period, $T/2$, of the AC signal (as shown in FIG. 4a). The generator of FIG. 2 further includes a DC power supply circuit 310 for deriving a smoothed and regulated direct current operating potential from the bridge rectifier output and bias circuit 320 coupled to the integrator for adjusting the pedestal or reference voltage level to which the intergrator is reset each half period.

Full wave rectifier 210 comprises a conventional four diode bridge circuit in which the AC input terminals 211 and 212 thereof are coupled by suitable means (such as a transformer, not shown) to AC input terminals 10 and 12. The bridge negative output terminal 213 is connected to a circuit reference potential point illustrated as ground. The bridge positive output terminal 214 is coupled to DC power supply circuit 310, zero voltage detector 220 and to integrator 230.

DC power supply circuit 310 includes a reverse current blocking diode 311 connected in series with current limiting resistor 312 to one plate of filter capacitor 313 and to the cathode of Zener diode 314. The other plate of capacitor 313 and the anode of diode 314 are connected to ground. Resistor 312 and capacitor 313 smooth the rectified signal produced by bridge rectifier 210 and diode 314 regulates the voltage to a fixed value. Diode 311 prevents reverse current flow from capacitor 313 to the bridge rectifier output terminal 214 which otherwise would occur at zero crossings of the AC input signal. This is necessary to insure proper operation of the zero-crossing detector 220 which detects zeros of the rectified signal to determine axis crossings of the AC signal.

Zero voltage detector 220 includes a common emitter connected NPN transistor 221 the base of which is connected to the bridge rectifier output terminal 214 by resistor 223 and to ground by resistor 224. The collector of transistor 221 is coupled via collector load resistor 225 to the output of DC supply 310. The values of resistors 224 and 223 are selected such that transistor 221 is turned off when the bridge output signal is at or within a few volts of ground potential. When that occurs, the current which otherwise would flow through resistor 225 via transistor 221 to ground is diverted to the base of clamp transistor 241 in clamp circuit 240 for resetting integrator 230.

Clamp circuit 240 includes clamp transistor 241 connected at the collector thereof to reset terminal 234 in integrator 230 and at the emitter thereof to ground via forward biased diode 242. Diode 242 receives a bias current via resistor 243 from DC supply 310 for maintaining the emitter of transistor 241 at a potential a few hundred millivolts above ground. The purpose of this bias is to assure that the base of transistor 241 which is connected to the collector of transistor 221 is reverse biased when transistor 221 is conductive thereby insuring that transistor 241 is fully turned off during the integration period. Transistor 241 is turned on by current supplied by resistor 243 when transistor 221 is off thereby clamping point 234 in integrator 230 to ground. This resets the integrator at each axis crossing of the AC signal.

Integrator 230 comprises a variable resistor 231 coupled between reset terminal 234 and the bridge rectifier output terminal 214. Reset terminal 234 is coupled via current limiting resistor 232 to ramp output terminal 235. Integrator capacitor 233 is connected between output terminal 235 and ground. Resistor 231 provides variable control of the ramp amplitude and capacitor 233 integrates the current supplied via resistors 231 and 232 each half period of the AC signal. Resistor 232 functions in conjunction with bias circuit 230, as will be explained, for controlling the reference voltage level to which the integrator is reset.

Bias circuit 320 includes a potentiometer 321 connected between ground and the output of DC supply 310 and a diode 323 connected at the anode and cathode thereof, respectively, to wiper 322 of potentiometer 321 and output terminal 235. Diode 323 is normally reverse biaded by the ramp voltage developed across capacitor 233. When clamp transistor 214 is turned on, however, capacitor 233 discharges through resistor 232, transistor 241 and diode 242 towards ground potential. The discharge continues until the capacitor voltage becomes less than the potential determined by the setting of wiper 322. At that time diode 323 becomes forward biased thereby limiting further discharge of capacitor 233. Therefore the voltage level to which the integrator is reset at each axis crossing can be adjusted by varying the setting of potentiometer 321.

In summary, the synchronous ramp generator circuit of FIG. 2 operates as follows. Rectifier circuit 210 produces a full wave rectified output signal in response to the sinusoidally varying AC input signal. The recitified output signal is applied to DC power supply circuit 310 which provides a source of smoothed and regulated Dc operating potential to zero voltage detector 220, clamp circuit 240 and bias circuit 320. The full wave rectified signal is also applied to integrator 230 which produces a ramp output signal the maximum amplitude of which is determined by the setting of variable resistor 231. Zero voltage detector 220 produces an output pulse each time that the rectified output signal is at or near ground potential which corresponds to the zero crossings of the AC signal. Clamp circuit 240, activated by the pulses produced by detector 220, clamps the integrator to a DC reference level determined by the setting of potentiometer 321 in bias circuit 320. Accordingly, the integrator is reset to a reference level at each axis crossing of the AC signal. Since the integrator is reset each half cycle and its input is a rectified sinewave its output signal is a ramp synchronized with the AC signal, the ramp beginning at a first value, monotonically changing to a second value and resetting to the first value twice each period T of the AC signal. Specifically, the ramp signal is a cosine shaped signal as shown in FIG. 4.

In applications where a linear synchronous ramp is desired, the generator of FIG. 2 may be modified by connecting the input of integrator 230 to a constant current source (not shown) rather than to the full wave rectifier output. When this is done the ramp signal will be of the form shown by dashed lines $m$ and $n$ in FIG. 4 and the switch 16 conduction period will vary linearly with the count in counter 60.

Although the conduction period of switch 16 in the system of FIG. 1 varies inversely with the count in counter 60, it will be appreciated that this relation may be reversed in a given application of the invention if so desired. This may be done, for example, by inverting the output of low pass filter 40, by complementing the counter outputs or by inverting the cosine ramp output. It will also be appreciated that, although the counter control signal format has been illustrated in terms of counter UP/DOWN control signals, other suitable formats may be employed instead. For example, the counter may be controlled by three signals UP, DOWN and STOP with logic such that application of the UP or DOWN signal causes the counter to count continuously in a desired direction until receipt of the STOP signal or the underflow/overflow inhibit signal.

What is claimed is:
1. In an alternating current control system of the kind comprising two power terminals for receiving a substantially sinusoidal alternating current signal thereacross, a thyristor and a load in series across said terminals, a comparator coupled to said thyristor for controlling the conduction angle thereof, means for applying a first control signal to a first input terminal of said comparator, a synchronous ramp generator coupled to a second input terminal of said comparator for supplying a second control signal thereto which changes, monotonically, from a first value to a second value and resets to the first value each half cycle of said alternating current signal, the improvement for providing a substantially cosinusoidal incremental variation of said thyristor conduction angle in response to linear incremental variations in a digital control signal, characterized in that:
    said synchronous ramp generator comprises full wave rectifier means having two input terminals for receiving said alternating current signal and two output terminals for producing a full wave rectified output signal, a series connection of a resistor and a capacitor coupled between said output terminals for producing a generally cosinusoidal ramp volt- age at a point on said series connection, said point being coupled to said second input terminal of said comparator, and zero voltage detector means for discharging said capacitor at each axis crossing of said alternating current signal; and said means for applying said first control signal to said comparator comprises a digital to analog converter having input means for receiving said digital control signal and output means coupled to said first terminal of said comparator.

2. The alternating current control system as recited in claim 1 wherein said synchronous ramp generator means further comprises circuit means coupled to said compacitor for maintaining at least a minimum charge level on said capacitor at each axis crossing of said alternating current signal, said circuit means comprising:

direct current supply means coupled to said full wave rectifier means and responsive to said full wave rectified output signal for producing a smoothed output voltage; and diode means coupled between said supply means and said capacitor, said diode mean being poled in a sense to be forward biased by said smoothed output voltage when said capacitor is discharged to said minimum charge level.

3. The alternating current control system as recited in claim 1 further comprising:

up-down counter means having output means coupled to said input means of said digital to analog converter means for supplying said digital control signal thereto in accordance with a count stored in said counter, input means responsive to input control signals supplied thereto for incrementing and decrementing said count, and underflow-overflow inhibit means for limiting the minimum and maximum values of said count; and power-up detector means coupled to said counter and responsive to an initial application of said alternating current signal to said two power terminals for presetting said count in said counter to an initial value.

* * * * *